(12) United States Patent
Kim

(10) Patent No.: US 8,741,440 B2
(45) Date of Patent: *Jun. 3, 2014

(54) NON-STICK CERAMIC COATING COMPOSITION AND PROCESS

(75) Inventor: Sang Mok Kim, Incheon (KR)

(73) Assignees: Sang Mok Kim, Incheon (KR); Brocker Business Development Group, Wassenaar (NL); Cerasol Hong Kong Limited, Kowloon (HK)

( * ) Notice: Subject to any disclaimer, the term of this patent is extended or adjusted under 35 U.S.C. 154(b) by 556 days.

This patent is subject to a terminal disclaimer.

(21) Appl. No.: 12/975,497

(22) Filed: Dec. 22, 2010

(65) Prior Publication Data

US 2011/0293950 A1    Dec. 1, 2011

Related U.S. Application Data

(63) Continuation-in-part of application No. 11/457,503, filed on Jul. 14, 2006, now Pat. No. 7,879,449.

(60) Provisional application No. 60/782,015, filed on Mar. 14, 2006, provisional application No. 60/793,504, filed on Apr. 20, 2006.

(51) Int. Cl.
*B32B 9/04*    (2006.01)

(52) U.S. Cl.
USPC ............ 428/447; 428/331; 428/448; 428/451

(58) Field of Classification Search
USPC .................................. 428/331, 447, 448, 451
See application file for complete search history.

(56) References Cited

U.S. PATENT DOCUMENTS

2001/0053445 A1*    12/2001    Kang et al. .................... 428/421

* cited by examiner

*Primary Examiner* — D. S. Nakarani
(74) *Attorney, Agent, or Firm* — The Law Office of Michael E. Kondoudis

(57) ABSTRACT

A series of new non-stick ceramic coating materials prepared from organic-inorganic hybrid materials, including silica sol, MTMS, FAS and PDMS (Polydimethylsiloxane) using the sol-gel process. The hybrid materials have good mechanical properties and are fashioned into a main ceramic network and good non-stick properties from organic non-stick compounds. The non-stick ceramic coating consists of two layers applied to cookware and for other applications.

10 Claims, 6 Drawing Sheets

US 8,741,440 B2

NON-STICK CERAMIC COATING COMPOSITION AND PROCESS

REFERENCE TO RELATED APPLICATIONS

This application is a Continuation-in-Part of U.S. application Ser. No. 11/457,503 filed Jul. 14, 2006, now allowed, now U.S. Pat. No. 7,879,449 which claims priority from U.S. provisional application No. 60/782,015, filed on Mar. 14, 2006, and from U.S. provisional application No. 60/793,504, filed on Apr. 20, 2006.

BACKGROUND OF INVENTION

1. Field of the Invention

The present invention relates to non-stick ceramic coating compositions and methods for making same, and for coating utensils or cookware made of stainless steel, aluminum, aluminum alloy, cast iron or steel.

2. Prior Art

Considerable effort has been directed at producing an effective, non-stick and non-wetting coating on a substrate that constitutes the surface of cookware for preparing food. The term "non-stick" signifies a surface that resists adherence of substances, such as oils, greases, or other food items. This property permits easy cleaning of dishes in which foods are prepared by heating. The term "non-wetting" indicates a surface that repels liquids such as water. The property is evidenced by a large contact angle between a drop of water and the surface on which the drop rests. An advancing angle of at least 90°, is considered as representative of a non-wettable surface.

Non-stick, non-wetting articles are commonly produced by coating article surfaces with a polytetrafluoroethylene (PTFE) layer. For example, U.S. Pat. No. 4,683,168 (Hares et al.) describes a process for coating glass or glass-ceramic articles with such a layer to produce non-stick cooking utensils. However, PTFE coatings exhibit the disadvantage of being opaque. Also, they require a thermal sintering process at 350-400° C. for their production, are relatively expensive to produce, and do not provide a desired degree of abrasion resistance.

U.S. Pat. No. 4,275,118 to Baney et al. describes a coating composition comprising an acidic dispersion of colloidal silica in an alcohol-water medium which produces a hard, abrasion-resistant coating.

U.S. Pat. No. 6,054,522 to Alain et al. discloses a protective coating which imparts non-stick, abrasion and hydrophobic properties with an inorganic network from metal alkoxides and an organic network from silanes via a sol-gel process. But this coating is very thin, which is not good as a protective coating, and also, has no color. These PTFE coatings have a finite life due to their organic makeup. Over time, these coatings dry out and lose their lubricity.

Various processes and materials have been proposed to create a non-stick coating. However, a problem persists regarding wear during use, in particular, scratching by cleaning agents.

SUMMARY OF THE INVENTION

It is therefore a principal object of the present invention to provide a novel coating composition, method of making same and method of applying that will result in a greater abrasion resistance, increased surface hardness, and longer wear.

In particular, it is an object of the present invention to disclose a non-stick coating composition comprising a colored base layer for bonding to a substrate, said base layer comprising 70 to 85% by weight a first matrix comprising the condensation product of a silica sol and an alkoxysilane mixture, said alkoxysilane mixture comprising 80-95% by weight of at least one organoalkoxysilane of chemical formula $R_xSi(OR')_{4-x}$, $0 \le x < 4$, and 5-20% by weight of polysiloxane and 5-30% by weight of a colorant; said base layer comprising a lower portion composed principally of (a) the condensation product of said silica sol and said organoalkoxysilane and (b) said colorant, and a distinct upper portion composed principally of (a) the condensation product of said silica sol and said polysiloxane and (b) said colorant; and a top layer superimposed upon, and bonded to, said base layer, said top layer comprising a second matrix comprising the condensation product of a silica sol and an alkoxysilane mixture comprising 80-95% by weight of organoalkoxysilane of chemical formula $R_xSi(OR')_{4-x}$, $0 \le x < 4$, 5-20% by weight of a polysiloxane, and about 0.3 to about 12% by weight of a fluoroalkylalkoxysilane.

It is a further object of this invention to disclose such a non-stick coating composition, wherein said at least one organoalkoxysilane is chosen from the group consisting of (a) organoalkoxysilanes wherein x=0 and each R' is chosen independently from the group consisting of methyl and ethyl; (b) organoalkoxysilanes wherein x=1, R is chosen from the group consisting of straight-chain or branched $C_1$-$C_8$ alkyl groups and aromatic groups, and each R' is chosen independently from the group consisting of methyl and ethyl; (c) organoalkoxysilanes wherein x=2, each R is chosen independently from the group consisting of straight-chain or branched $C_1$-$C_8$ alkyl groups and aromatic groups, and each R' is chosen independently from the group consisting of methyl and ethyl; (d) organoalkoxysilanes wherein x=3, each R is chosen independently from the group consisting of straight-chain or branched $C_1$-$C_8$ alkyl groups and aromatic groups, and each R' is chosen independently from the group consisting of methyl and ethyl; (e) organoalkoxysilanes wherein R is a substituent chosen from the group consisting of $(R_AR_B)N(CH_2)_n$—, $(R_AR_B)NNH(CH_2)_n$—, $(R_AR_B)N(CH_2)_n[N(H)(CH_2)_m]_y$—, and $(R_AR_B)N(CH_2)_n[N(H)(CH_2)_m]_yCH_2$—, where $R_A$ and $R_B$ are independently chosen from H, $C_1$-$C_8$ straight-chain, branched chain, and cyclic alkyl groups, or $(R_AR_BN)$ describes a piperizinyl, piperidinyl, or morpholine ring, $n \le 3$, $m \le 3$, and $y \le 3$, and each R' is chosen independently from the group consisting of straight-chain or branched $C_1$-$C_8$ alkyl groups and aromatic groups; (f) organoalkoxysilanes wherein R is a vinyl group, and each R' is chosen independently from the group consisting of straight-chain or branched $C_1$-$C_8$ alkyl groups and aromatic groups; (g) organoalkoxysilanes wherein R is a 3-glycidoxypropyl group and R' is chosen independently from the group consisting of straight-chain or branched $C_1$-$C_8$ alkyl groups and aromatic groups; (h) organoalkoxysilanes wherein R is a 3-methacryloxypropyl group and each R' is chosen independently from the group consisting of straight-chain or branched $C_1$-$C_8$ alkyl groups and aromatic groups; (i) organoalkoxysilanes wherein R is an alkyl group in which at least one H atom is substituted with a halogen atom and each R' is chosen independently from the group consisting of straight-chain or branched $C_1$-$C_8$ alkyl groups and aromatic groups; (j) organoalkoxysilanes wherein R is an —SH terminated alkyl group, and each R' is chosen independently from the group consisting of straight-chain or branched $C_1$-$C_8$ alkyl groups and aromatic groups; and (k) any combination of the above.

It is a further object of this invention to disclose such a non-stick coating composition, wherein said organoalkoxysilane is methyltrimethoxysilane.

It is a further object of this invention to disclose such a non-stick coating composition, wherein wherein said polysiloxane is polydimethylsiloxane.

It is a further object of this invention to disclose such a non-stick coating composition, wherein the polydimethylsiloxane has a molecular weight of between 400 and 6000.

It is a further object of this invention to disclose such a non-stick coating composition, wherein said polysiloxane is chosen from the group consisting of polysiloxanes and polysiloxane copolymers of the general formula QO—[$SiR_A R_B O$]$_n$—$SiR_A R_B OQ$, wherein Q is chosen from the group consisting of H and organic substituents, and wherein $R_A$ and $R_B$ are independently chosen from H, straight-chain alkyl groups, branched-chain alkyl groups, cyclic alkyl groups, aromatic groups, $RNHR'NH_2$, $C_3H_5O(C_2H_4)_m(CH_3C_2H_3O)_n H$, $C_3H_5O(C_2H_4)_m(CH_3C_2H_3O)_n R$, $(CH_2)_3OCH_2C_2H_3O$, and $(CH_2)_n CF_3$.

It is a further object of this invention to disclose such a non-stick coating composition, wherein the fluoroalkylalkoxysilane is present from about 0.3 to about 2% by weight.

It is a further object of this invention to disclose such a non-stick coating composition, wherein the silica sol is present in an amount from about 30 to about 70% by weight, and $R_x Si(OR')_{4-x}$ is present in an amount from about 2 to about 40% by weight.

It is a further object of this invention to disclose such a non-stick coating composition, additionally comprising a catalyst present in an amount from 0 to about 2% by weight.

It is a further object of this invention to disclose such a non-stick coating composition, further including a solvent in an amount from about 10 to about 40% by weight.

It is a further object of this invention to disclose a method of making a non-stick ceramic coating for a substrate, comprising steps of (a) making a first component by adding a colloidal silica sol to at least one organoalkoxysilane of chemical formula $R_x Si(OR')_{4-x}$, $0 \leq x < 4$, and a catalyst to effect a condensation reaction; adding a solvent; and adding a color material in particulate form; mixing to form a first stable binder solution; (b) making a second component by: adding an organoalkoxysilane and a catalyst, said organoalkoxysilane including a minor portion of fluoroalkylalkoxysilane; adding a solvent; and mixing to form a second stable binder solution; (c) mixing the two components; and (d) aging the mixed two components whereby the aged two component solution is coated on a substrate.

It is a further object of this invention to disclose such a method, wherein said at least one organoalkoxysilane is chosen from the group consisting of (a) organoalkoxysilanes wherein x=0 and each R' is chosen independently from the group consisting of methyl and ethyl; (b) organoalkoxysilanes wherein x=1, R is chosen from the group consisting of straight-chain or branched $C_1$-$C_8$ alkyl groups and aromatic groups, and each R' is chosen independently from the group consisting of methyl and ethyl; (c) organoalkoxysilanes wherein x=2, each R is chosen independently from the group consisting of straight-chain or branched $C_1$-$C_8$ alkyl groups and aromatic groups, and each R' is chosen independently from the group consisting of methyl and ethyl; (d) organoalkoxysilanes wherein x=3, each R is chosen independently from the group consisting of straight-chain or branched $C_1$-$C_8$ alkyl groups and aromatic groups, and each R' is chosen independently from the group consisting of methyl and ethyl; (e) organoalkoxysilanes wherein R is a substituent chosen from the group consisting of $(R_A R_B)N (CH_2)_n$—, $(R_A R_B)NNH(CH_2)_n$—, $(R_A R_B)N(CH_2)_n[N(H)(CH_2)_m]_y$—, and $(R_A R_B)N(CH_2)_n[N(H)(CH_2)_m]_y CH_2$—, where $R_A$ and $R_B$ are independently chosen from H, $C_1$-$C_8$ straight-chain, branched chain, and cyclic alkyl groups, or such that ($R_A R_B N$) together describe a pyrrolidinyl, piperidinyl, or morpholino ring, $n \leq 3$, $m \leq 3$, and $y \leq 3$, and each R' is chosen independently from the group consisting of straight-chain or branched $C_1$-$C_8$ alkyl groups and aromatic groups; (f) organoalkoxysilanes wherein R is a vinyl group, and each R' is chosen independently from the group consisting of straight-chain or branched $C_1$-$C_8$ alkyl groups and aromatic groups; (g) organoalkoxysilanes wherein R is a 3-glycidoxypropyl group and R' is chosen independently from the group consisting of straight-chain or branched $C_1$-$C_8$ alkyl groups and aromatic groups; (h) organoalkoxysilanes wherein R is a 3-methacryloxypropyl group and each R' is chosen independently from the group consisting of straight-chain or branched $C_1$-$C_8$ alkyl groups and aromatic groups; (i) organoalkoxysilanes wherein R is an alkyl group in which at least one H atom is substituted with a halogen atom and each R' is chosen independently from the group consisting of straight-chain or branched $C_1$-$C_8$ alkyl groups and aromatic groups; (j) organoalkoxysilanes wherein R is an —SH terminated alkyl group, and each R' is chosen independently from the group consisting of straight-chain or branched $C_1$-$C_8$ alkyl groups and aromatic groups; and (k) any combination of the above.

It is a further object of this invention to disclose such a method, wherein said organoalkoxysilane is methyltrimethoxysilane.

It is a further object of this invention to disclose such a method, wherein the second stable binder solution includes a polysiloxane.

It is a further object of this invention to disclose such a method, wherein said polysiloxane is chosen from the group consisting of polysiloxanes and polysiloxane copolymers of the general formula QO—[$SiR_A R_B O$]$_n SiR_A R_B OQ$, wherein Q is chosen from the group consisting of H and organic substituents, and wherein $R_A$ and $R_B$ are independently chosen from H, straight-chain and branched-chain alkyl groups, aromatic groups, $RNHRNH_2$, $C_3H_5O(C_2H_4)_m(CH_3C_2H_3O)_n H$, $C_3H_5O(C_2H_4)_m(CH_3C_2H_3O)_n R$, $(CH_2)_3OCH_2C_2H_3O$, and $(CH_2)_n CF_3$.

It is a further object of this invention to disclose such a method, wherein said substrate is the cooking surface of a cooking utensil.

It is a further object of this invention to disclose a non-stick ceramic coating as defined in any of the above made by a method as defined in any of the above.

It is a further object of this invention to disclose the use of a method for making a non-stick ceramic coating as defined in any of the above to make a non-stick coating as defined in any of the above.

It is a further object of this invention to disclose a method of coating a substrate with a non-stick ceramic coating comprising steps of (a) preparing a substrate by removing dust and oil from the substrate surface to be coated; drying the substrate surface; roughening the substrate surface to substantially increase its area; and cleaning the substrate surface and preheating the substrate surface; (b) coating the substrate surface with a first coating comprising a colored base layer as defined in any of the above; (c) coating the substrate with a second coating comprising a top layer as defined in any of the above, and (d) drying in air.

It is a further object of this invention to disclose such a method of coating a substrate with a non-stick ceramic coating, wherein the coating is sprayed onto the substrate and heated to 120° C. to 300° C. for 10 to 30 minutes.

It is a further object of this invention to disclose such a method of coating a substrate with a non-stick ceramic coating, wherein the fluoroalkylalkoxysilane is present from about 0.3 wt % to about 2 wt %.

It is a further object of this invention to disclose such a method of coating a substrate with a non-stick ceramic coating, wherein the organoalkoxysilane is methyltrimethoxysilane.

It is a further object of this invention to disclose such a method of coating a substrate with a non-stick ceramic coating, wherein the silica sol is present in an amount from 30 wt % to about 70 wt %, and the methyltrimethoxysilane is present in an amount from 2 wt % to 40 wt %.

It is a further object of this invention to disclose such a method of coating a substrate with a non-stick ceramic coating, wherein a catalyst is present in an amount form 0 wt % to about 2 wt %.

It is a further object of this invention to disclose such a method of coating a substrate with a non-stick ceramic coating, wherein said solvent is present in an amount from 10 wt % to 40 wt %.

It is a further object of this invention to disclose a non-stick ceramic coated substrate comprising (a) a substrate having a surface to be coated; (b) a first layer coated on the surface of the substrate to be coated and having an exposed top surface; and (c) a second layer coated on the exposed top of the first layer and having an exposed top surface serving as a non-stick ceramic surface suitable for cooking food; said first layer comprised of a lower portion in contact with the surface of said the substrate and being composed of a colorant and a $SiO_2$ matrix resulting from the condensation of a colloidal silica sol and an organoalkoxysilane; and the upper portion of the first layer being composed of a $SiO_2$ matrix resulting from the condensation of a colloidal silica sol and an organoalkoxysilane containing a minor portion of a polysiloxane; said second layer comprised of a $SiO_2$ matrix resulting from the condensation of a colloidal silica sol and an organoalkoxysilane containing a minor portion of polysiloxane, and a minor portion of fluoroalkylalkoxysilane.

It is a further object of this invention to disclose such a non-stick ceramic coated substrate, wherein said fluoroalkylalkoxysilane is present from about 0.3 wt % to about 2 wt %.

It is a further object of this invention to disclose such a non-stick ceramic coated substrate, wherein said organoalkoxysilane is methyltrimethoxysilane.

It is a further object of this invention to disclose such a non-stick ceramic coated substrate, wherein the silica sol is present in an amount from 30 wt % to about 70 wt %, and the methyltrimethoxysilane is present in an amount from 2 wt % to 40 wt %.

It is a further object of this invention to disclose such a non-stick ceramic coated substrate, wherein a catalyst is present in an amount form 0 wt % to about 2 wt %.

It is a further object of this invention to disclose such a non-stick ceramic coated substrate, further including a solvent in an amount from 10 wt % to 40 wt %.

It is a further object of this invention to disclose a kit for production of a non-stick ceramic coating composition, said kit comprising two solutions provided in separate containers, said two solutions comprising an "A" solution comprising a colorant, 30-70 wt % of a silica sol, 2-40 wt % of organoalkoxysilane of formula $R_xSi(OR)_{4-x}$, $0 \leq x < 4$, 0-2 wt % of a catalyst, and 10-40 wt % of a solvent, and a "B" solution comprising 75-99 wt % of organoalkoxysilane of formula $R_xSi(OR)_{4-x}$, $0 \leq x < 4$, 0.3-2 wt % of fluoroalkylalkoxysilane, 5-20 wt % of a polysiloxane, and 0-3 wt % of a catalyst.

Other and further objects of the present invention will become apparent from the following detailed description of the invention when taken in conjunction with the appended drawings.

DETAILED DESCRIPTION OF PREFERRED EMBODIMENTS OF THE INVENTION

Figure 1:
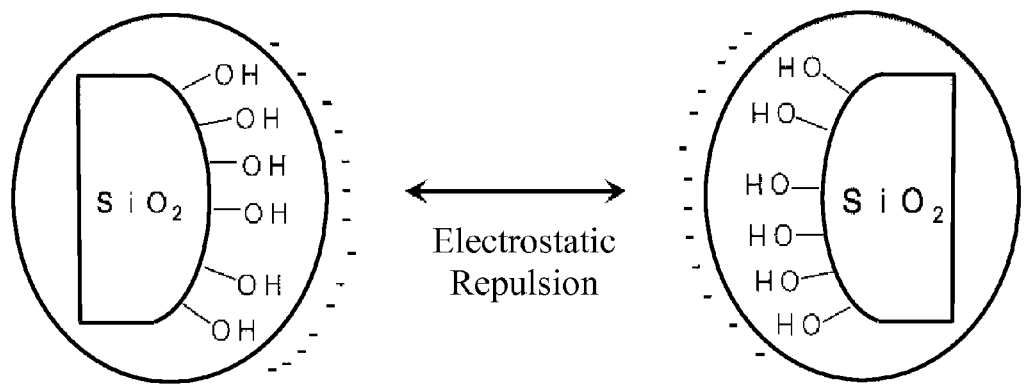
FIG. 1 is a diagram illustrating a stable state of silica sol particles showing how electrostatic repulsion occurs whereby the particles make a stable dispersion.
Figure 2:
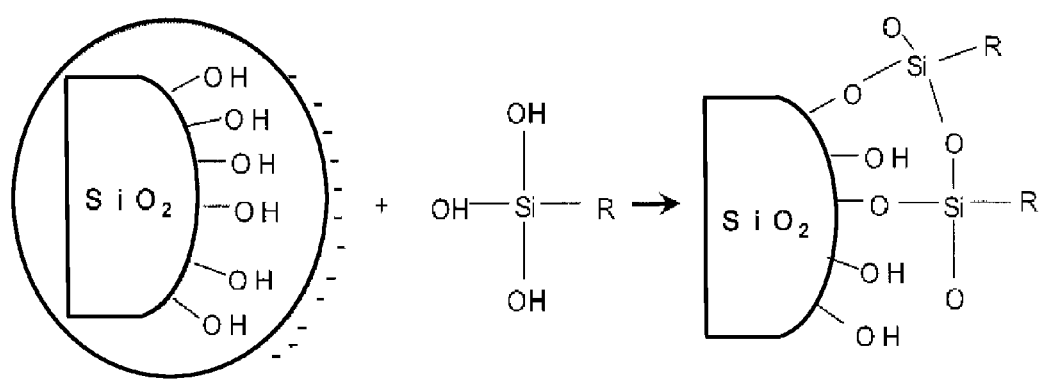
FIG. 2 is a diagram illustrating the condensation mechanism of organoalkoxysilane with a colloidal silica sol.

Referring now to the drawings, there will be described novel abrasion resistant and high hardness non-stick coatings primarily for cookware, although they have other industrial and commercial uses. The novel coating includes a $SiO_2$ ceramic matrix that includes the condensation product of hydrolyzed alkoxysilane and a colloidal silica sol. A series of new abrasion resistant and high hardness non-stick coating materials have been developed with ceramic matrix and organic compounds by sol-gel process.

As used herein, the term "binder" refers to the product of chemical reaction between a silica sol and an organoalkoxysilane in an alcoholic solvent base.

As used herein, the term "silane" refers to any silicon-containing compound that contains at least one functional group that makes it suitable for the reactions used to prepare the non-stick coatings disclosed in the present invention. As particular but non-limiting examples, the organoalkoxysilanes and fluoroalkylalkoxysilane discussed in detail below fall within the definition of the term "silane" as used herein.

As used herein, the term "polysiloxane" includes any OH-terminated or OR-terminated polymer of the general form $QO-[SiR_AR_BO]_n-SiR_AR_BOQ$, where Q represents either H or an organic substituent. The term also includes copolymers in which different Si atoms in the chain are attached to different pairs of substituents. Thus, as non-limiting examples, copolymers such as $QO-[SiR_AR_BOSiR_CR_DO]_n-SiR_AR_BOQ$ and $QO-[SiR_AR_BOSiR_CR_DOSiR_AR_BO]_n-Q$ are included within the definition of "polysiloxane" as used herein.

As used herein, unless specifically defined otherwise, the abbreviation "R," when appearing in formula or structure of a chemical compound, refers generically to any organic substituent known in the art to be suitable for use in the reactions of the compound relevant to the invention herein disclosed. Abbreviations such as "$R_A$," "$R_B$", "R'," and the like, indicate that the substituents are chosen independently of one another, not necessarily that they are different.

The non-stick material of the present invention has two main components that contribute to its silicon dioxide backbone, a silica sol (which is pure $SiO_2$) and an organoalkoxysilane, which is an organic-inorganic hybrid material. Both materials can make strong chemical bonds from condensation reactions. OR' groups of $R_xSi(OR')_{4-x}$ are hydrolyzed with water and then condense with silica sol and each other. The ceramic non-stick hybrid coating is applied by a sol-gel process. Two kinds of non-stick organic compounds make a chemical bond with silica ceramic network or matrix and it can exist in the ceramic structure in a stable state.

The main matrix is composed of a network of silica formed by the chemical reaction or condensation of colloidal silica sol (water base) and an organoalkoxysilane. In preferred embodiments, the silica sol is prepared by the ion exchange method. The organoalkoxysilane may be any alkoxysilane of the general formula $R_xSi(OR')_{4-x}$, where R represents an organic substituent, R' represents an alkyl group, and $0 \leq x < 4$. In preferred embodiments, the R substituents are chosen from the group comprising aliphatic hydrocarbon groups, aromatic hydrocarbon groups, and organic functional groups. In most preferred embodiments, the R substituents may be straight or branched chain $C_1$-$C_8$ alkyl groups; phenyl groups; or organic substituents such as amino, vinyl, epoxy, methacrylate, chloropropyl, or mercapto. In preferred embodiments, R' groups are chosen from methyl and ethyl. Use of organoalkoxysilanes comprising more than one different R and/or R' groups is within the scope of the invention. In preferred embodiments, x=0 or 1, i.e. the organoalkoxysilane has three or four hydrolysable sites. This increases cohesion and bonding of the components and also provides a thickened layer and increases the links with the inorganic silica surface.

In other embodiments of the invention, other alkoxysilanes may be used. Non-limiting examples of alkoxysilanes that are useful in the invention herein disclosed include organoalkoxysilanes in which (a) R is a substituent chosen from the group consisting of $(R_AR_B)N(CH_2)_n-$, $(R_AR_B)NNH(CH_2)_n-$, $(R_AR_B)N(CH_2)_n[N(H)(CH_2)_m]_y-$, and $(R_AR_B)N(CH_2)_n[N(H)(CH_2)_m]_yCH_2-$, where $R_A$ and $R_B$ are independently chosen from H, $C_1$-$C_8$ straight-chain, branched chain, and cyclic alkyl groups, or such that $(R_AR_BN)$ together describe a pyrrolidinyl, piperidinyl, or morpholino ring, $n \leq 3$, $m \leq 3$, and $y \leq 3$, and each R' is chosen independently from the group consisting of straight-chain or branched $C_1$-$C_8$ alkyl groups and aromatic groups; (b) R is a vinyl group, and each R' is chosen independently from the group consisting of straight-chain or branched $C_1$-$C_8$ alkyl groups and aromatic groups; (c) R is a 3-glycidoxypropyl group and R' is chosen independently from the group consisting of straight-chain or branched $C_1$-$C_8$ alkyl groups and aromatic groups; (d) R is a 3-methacryloxypropyl group and each R' is chosen independently from the group consisting of straight-chain or branched $C_1$-$C_8$ alkyl groups and aromatic groups; (e) R is an alkyl group in which at least one H atom is substituted with a halogen atom and each R' is chosen independently from the group consisting of straight-chain or branched $C_1$-$C_8$ alkyl groups and aromatic groups; (f) R is an —SH terminated alkyl group, and each R' is chosen independently from the group consisting of straight-chain or branched $C_1$-$C_8$ alkyl groups and aromatic groups; and (g) any combination of the above.

The colloidal silica sol is very stable because of the electrostatic repulsion of the silica particle surface, as illustrated in FIG. 1. The colloidal silica sol is acidified with a mineral or organic acid to reduce the pH below approximately 4. Non-limiting examples of acids that can be used for pH regulation of the process include hydrochloric acid, nitric acid, sulfuric acid, formic acid, propionic acid and acetic acid.

The alkoxy sites of the organoalkoxysilane are hydrolyzed by the water that is in silica sol; in preferred embodiments, the reaction is accelerated by use of an acidic catalyst. The following reaction illustrates the hydrolysis of an organoalkoxysilane (x=1):

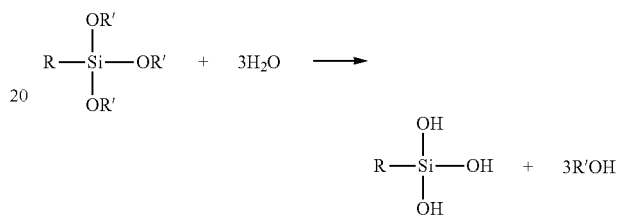

Hydrolysis and condensation reactions of organoalkoxysilanes of general formula $R_xSi(OR')_{4-x}$ are well known in the art (see, for example, "Principles of Hydrolysis and Condensation Reaction of Alkoxysilanes" (Schmidt, H.; Scholze, H.; Kaiser, A. *J. Non-Crystalline Solids* 63 (1984) 1-11) and "Hydrolysis and Condensation of Silicates: Effects on Structure" (Brinker, C. J. *J. Non-Crystalline Solids* 100 (1988) 31-50), both of which are hereby incorporated by reference). It is well known in the art that hydrolysis and condensation rates of organoalkoxysilanes are slowed by sterically hindered substituents. Thus, in the most preferred embodiments, functional groups with minimal steric hindrance (e.g. R=methyl, ethyl, propyl; R'=methyl or ethyl) are used.

Hydrolyzed hydroxyl groups of organoalkoxysilane can react further to form strong bonds with each other, as shown in the following reaction, and also can connect on the silica surface.

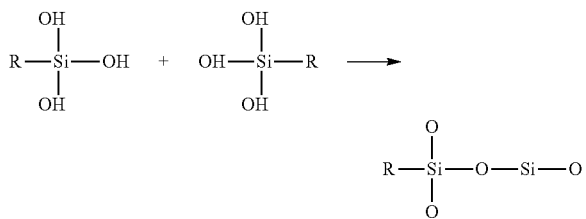

In preferred embodiments, all chemical reactions described herein are performed under acidic conditions. In preferred embodiments, the reactions take place at 2.0<pH<4.5 and at room temperature. For the acid catalysts, and appropriate organic or inorganic acid catalyst known in the art may be used. Since most of the reactions are exothermic, the solution temperature can rise to ~60° C. Adding the acidic catalyst puts the reacted solution in acidic state below pH 4. Under this pH conditions, colloidal silica sols can effect condensation with each other, but the existence of reacted organoalkoxysilanes on the sol surface can reduce the possibility of the sol condensation, which can increase the storage time of the solution. The weight proportion of organoalkoxysilane in the matrix composition to the silica sol can vary. For example, the organoalkoxysilane can be about from 5 wt % to 50 wt % of silica sol.

An alcoholic solvent is added in the mixture of silica sol and organoalkoxysilane; non-limiting examples of suitable alcohols include methanol, ethanol, and propanol. Ethanol or propanol is preferred. The proportion of solvent to the mixture of organoalkoxysilane and silica sol is from 10 wt % to 50 wt %. The alcohol is added primarily to prevent gelation of the solution. This mixed material (matrix), organoalkoxysilane, silica sol and alcoholic solvent, is used as a binder. The binder remains stable for at least three months.

We note that none of the three ingredients of the binder (organoalkoxysilane, silica sol and alcohol) is by itself capable of functioning as the binder or produce a film structure. Some amount of silica sol and organoalkoxysilane must be mixed and chemically react for a binder to be formed. In this reaction, alcohol solvent is necessary as well.

Figure 3:
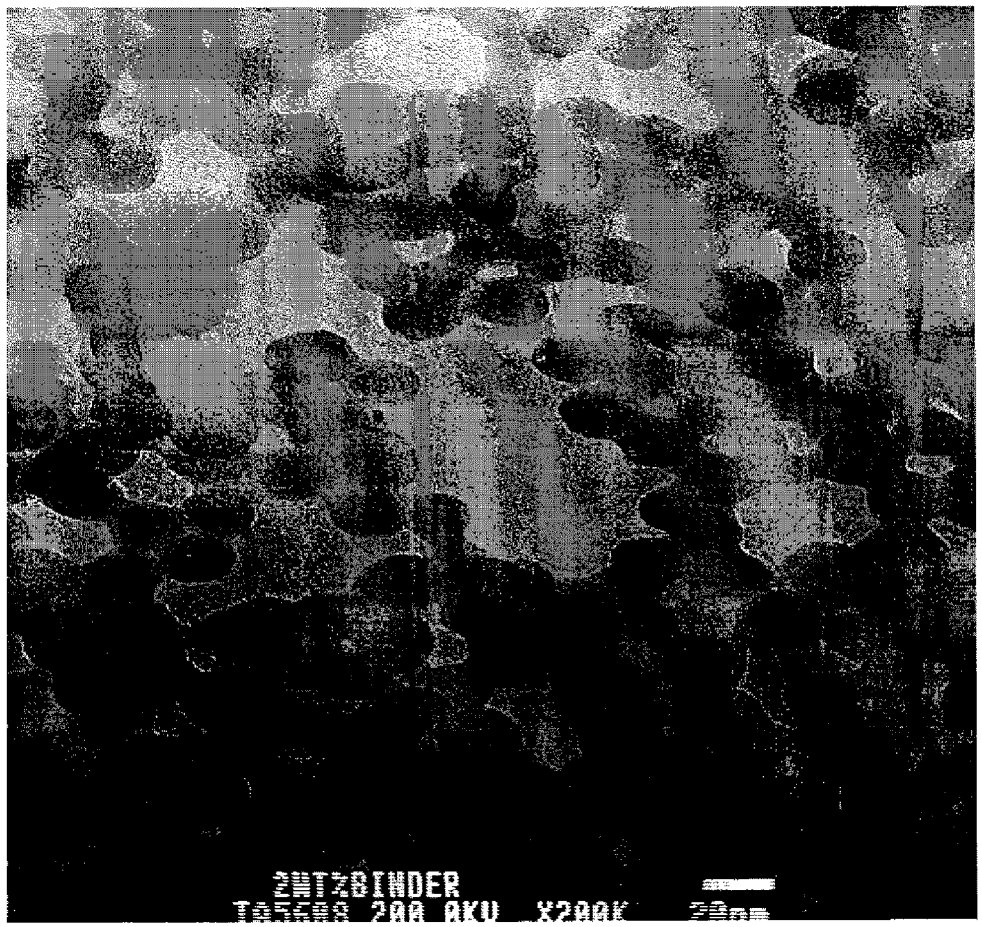
FIG. 3 is a TEM picture of a reacted first binder, consisting of an organoalkoxysilane condensed with colloidal silica sol.

The surface of the colloidal silica particles is coated by organoalkoxysilanes, in other words, hydrolyzed organoalkoxysilane makes a thin layer or coating on the silica surface as a result of the condensation reaction with the hydroxyl groups of the silica surface. FIG. 3 shows a TEM illustrating the structure of organoalkoxysilane coated silica sol whereby stable organoalkoxysilane layers are formed on the silica particles. The layer or coating can prevent cohesion among the silica particles and also serves to bridge each particle with other organoalkoxysilanes.

Organoalkoxysilanes are then applied to the matrix system described above. The same organoalkoxysilane may be used as was used previously, or different ones may be used instead. In preferred embodiments, the organoalkoxysilanes used in this step are ones that have good non-stick properties that can make strong chemical bonds with organoalkoxysilanes. Non-limiting examples of additional organoalkoxysilanes that are used in preferred embodiments include fluoroalkylalkoxysilane (FAS), polysiloxanes, and polysiloxane copolymers (i.e. polysiloxanes comprising a plurality of different $SiR_A R_B O$ units). Non-limiting examples of polysiloxanes that are useful in the present invention include those in which $R_A$ and $R_B$ are independently chosen from H, straight-chain and branched-chain alkyl groups, aromatic groups, $RNHR'NH_2$, $C_3H_5O(C_2H_4)_m(CH_3C_2H_3O)_nH$, $C_3H_5O(C_2H_4)_m(CH_3C_2H_3O)_nR$, $(CH_2)_3OCH_2C_2H_3O$, and $(CH_2)_nCF_3$. In more preferred embodiments, the polysiloxane used is polydimethylsiloxane (PDMS, in which $R_A=R_B=CH_3$).

Polysiloxanes have similar a backbone structure to the main matrix of $SiO_2$, and its terminal hydroxyl chains can react via condensation with hydrolyzed organoalkoxysilane and the silica surface. Because polysiloxanes are strongly hydrophobic, it can displace water from the matrix so that it can reduce the capillary stress and possibility of cracking during drying procedure. The good thermal stability of polysiloxanes enables their use in preparations of ceramic matrices for high temperature applications. The following reaction shows a typical condensation between $RSi(OH)_3$ produced from hydrolysis of an organoalkoxysilane (x=1) and PDMS.

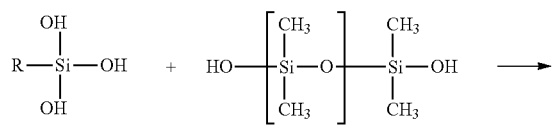

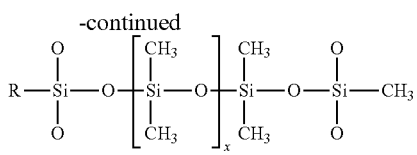

The number of $CH_3-Si-CH_3$ monomers in the chain determines the PDMS molecular weight and this chain helps the structure to have good non-stick properties. In preferred embodiments of the invention in which PDMS is used, the molecular weight of PDMS used is between about 400 and about 6000.

FAS indicates any alkoxysilane having the general formula $R_xSi(OR')_{4-x}$, in which R is chosen independently and partially or totally substituted by fluorine atoms. In preferred embodiments of the invention, FAS of general formula $CF_3(CF_2)_m(CH_3)_nSi(OR')_3$ are used. The alkoxy(OR') chains of FAS are hydrolyzed and react via condensation with the silica sol surface and organoalkoxysilane matrix in reactions analogous to those shown above for PDMS. The fluoro chain of FAS increases the non-stick properties of the structure and the three alkoxy chains make a strong and stable oxygen bond with the ceramic network (matrix).

In the method of the invention silanes are added twice. In a first step or stage, silanes are added with only catalyst, but in the second step, silanes are added with catalyst and additives. In this second step, the invention uses polysiloxane and FAS for their non-stick properties. Additives and some amount of silane can be substituted.

FAS and polysiloxane play an important role as hardeners with additional organoalkoxysilane in the first mixed solution. Alkoxy chains of the organoalkoxysilane, FAS and polysiloxane are hydrolyzed and react via condensation with the hydroxyl groups of silica sol and previously added organoalkoxysilane.

In preferred embodiments of the invention, it employs a two layer coating system, a base layer and a top layer. In the base layer the only non-stick additive used is the polysiloxane; in preferred embodiments, the amount used is from 5 to 20 wt %. In the top layer both polysiloxane and FAS are used as the non-stick additives. About 5-20 wt % of silanes are substituted with polysiloxane and about 0.5-12 wt % of silanes are substituted with FAS.

Epoxysilanes, which tend to adhere well to a metal substrate, can be added as well. Expoxysilanes have the additional advantageous property that they can increase the flexibility of the matrix structure. Thus, the organoalkoxysilane used to prepare the non-stick coating may comprise in part an epoxysilane as well. In preferred embodiments of the invention in which epoxysilanes are included, about 5-50 wt % of organoalkoxysilane of the base layer is substituted with epoxy silane in the first step, while about 5-30 wt % is substituted in the second step.

The substrate can be any kind of material. Non-limiting examples of suitable substrates for the non-stick coating include all kinds of metal, plastic, stone, glass, etc. In preferred embodiments, prior to application of the non-stick coating, the substrate is prepared by a sand blasting procedure described in detail below. Metal, which has a low surface hardness and strength, is a particularly efficient substrate for the ceramic coatings of the present invention. Aluminum is the most popular metal element for a substrate, and adheres well to the novel ceramic coating of the present invention.

Figure 4:
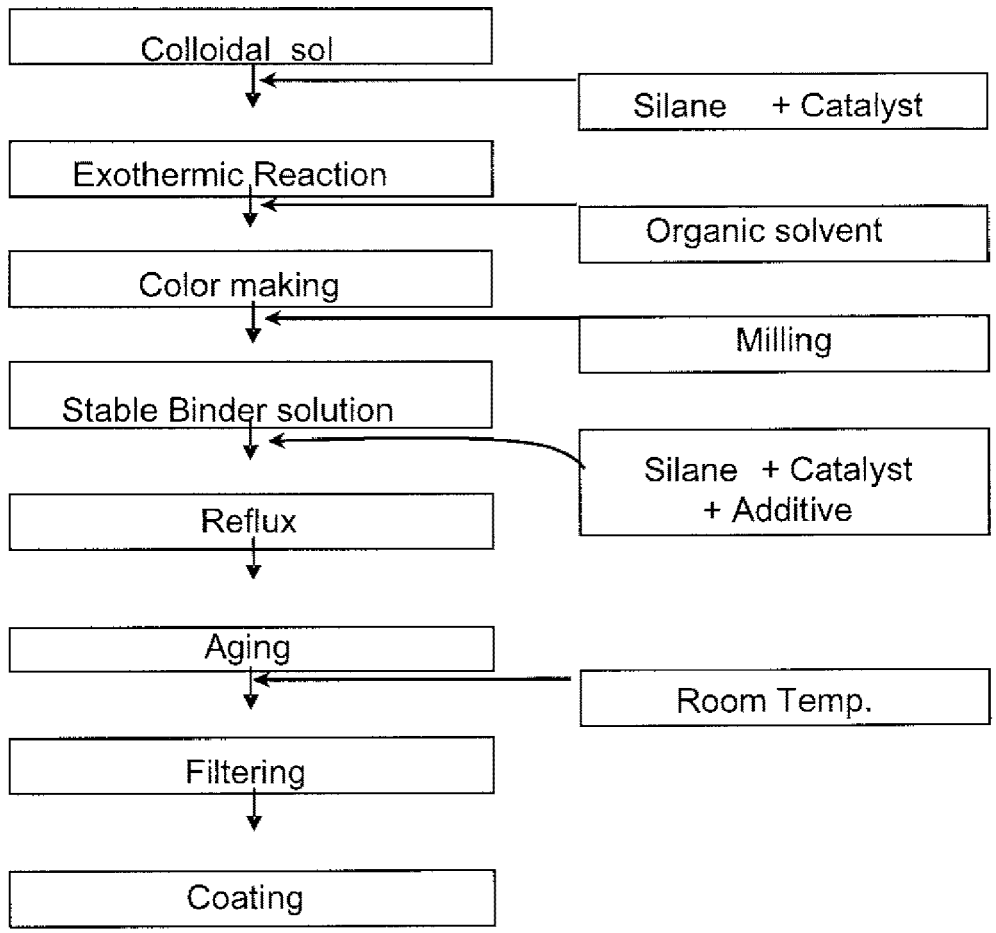
FIG. 4 is a block diagram showing the novel method for making a coating solution according to the present invention.

FIG. 4 shows a block diagram setting out the chemical reaction procedure of the non-stick ceramic coating solution.

Shown are the method steps for making the composition of the invention, i.e., the procedure of the reaction from the raw materials. As shown in this block diagram, silane is added twice at different stages. As shown in FIG. 4, first the silica sol is made, then silane and catalyst are added and the exothermic reaction takes place. Then the organic solvent is added and the color is added in color making Then milling takes place and a stable binder solution results. Next silane and catalyst are added and reflux takes place. The binder is aged and then brought to room temperature and filtering takes place. Finally the composition is ready and coating takes place.

In one form of the invention, the compositions are prepared in kit form. This kit comprises two types of solutions, "A" solution and "B" solution, which are stored in separate bottles. The "A" solution comprises the color of the coating, while the "B" solution is transparent. The final steps of the preparation of the ceramic non-stick coating of the present invention are performed by the end user, who mixes "A" and "B" solutions and performs the last reflux procedure. At the first stage for making "A" solution, no non-stick additives are used. The proportions of sol and silane are shown the following table. For the second stage, making the "B" solution, FAS and polysiloxane are used with silane as shown the table.

TABLE 1

Preparation of "A" and "B" solutions

|  | Silica sol | MTMS | Catalyst | Solvent |
|---|---|---|---|---|
| "A" solution | 30 wt %~70 wt % | 2 wt %~40 wt % | 0 wt %~2 wt % | 10 wt %~40 wt % |

|  | MTMS | FAS | Polysiloxane | Catalyst |
|---|---|---|---|---|
| "B" solution | 75 wt %~99 wt % | 0.3 wt %~2 wt % | 5 wt %~20 wt % | 0 wt %~3 wt % |

Figure 5:
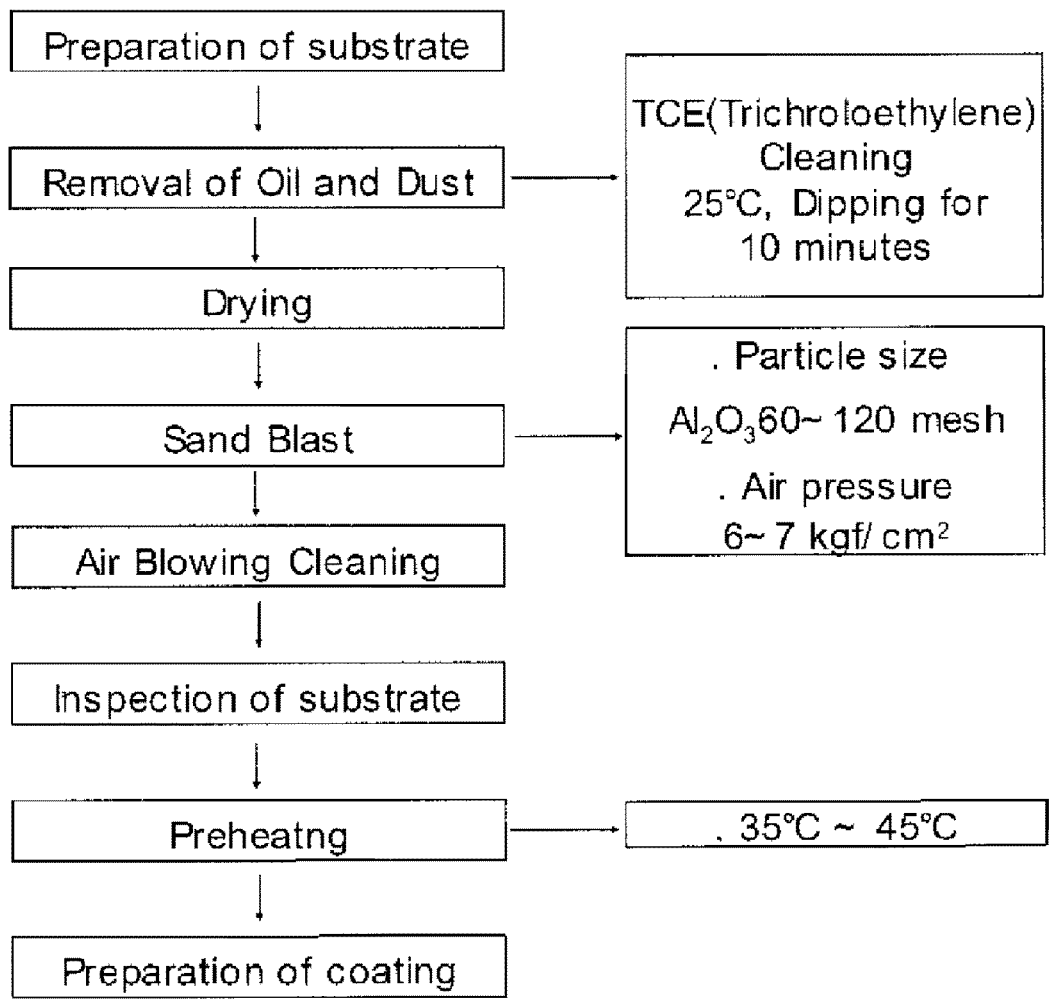
FIG. 5 is a block diagram showing the method of pretreatment of a substrate surface.

The coating solution is applied to the surface of a suitable substrate in order to provide a non-stick surface to the substrate. In preferred embodiments, prior to coating, a surface pretreatment procedure is performed in order to prepare a sufficiently adhesive and homogeneous surface. FIG. 5 shows in block diagram the surface pretreatment of the substrate. The first step is to prepare the substrate. Next the oil and dust are removed from the substrate by use of a suitable cleaning/degreasing agent. In preferred embodiments, the cleaning/degreasing agent is TCE (trichloroethylene), and the substrate is cleaned of oil and dust by heating to 25° C. and dipping for 10 minutes. Next the substrate is dried and then, in order to roughen the surface and increase its area substantially, sandblasted using $Al_2O_3$ particles, with an air pressure of typically 6-7 $kgf/cm^2$. The amount of surface area and state of the surface area are most important variables for ceramic coating. High surface area gives a substrate enough surface energy to provide a high adhesion force. To make this high surface area, in preferred embodiments, the sandblasting is performed using 60 to 120 mesh particles after the surface has been freed of dust and oil. Thereafter, the substrate is blown clean using suitable air pressure. The substrate is inspected and then preheated, in preferred embodiments, to a temperature of 35-45° C. This preheating procedure is necessary to provide a good adhesive force to the substrate, and has the added benefit of increasing the coating thickness of the ceramic coating on, for example, an aluminum substrate. After the surface pretreatment procedure is completed, the surface of the substrate is ready for coating.

In the procedure illustrated in the block diagram there is a color making step. This step includes the "milling" step. Any suitable pigment may be used for the color; in preferred embodiments, inorganic pigments are used. In preferred embodiments, 60 wt %~80 wt % of stable binder is mixed with the pigment (15 wt %~30 wt %) and filler ($BaSO_4$, mica, talc, etc.). Any suitable type of mill may be used; in preferred embodiments, the mill used is a ball mill, sand mill, or ring mill. The color desired is obtained in the known way from the various kinds of pigments presently known and used in the art. After refluxing of silica sol and silane with organic solvent, a stable solution results, as previously described.

As mentioned above, the procedure illustrated in FIG. 4, may include a step of introducing at least one additive during the second addition of the silane and catalyst. In preferred embodiments, FAS and/or polysiloxane are added because of their non-stick properties. Alternatively or additionally, special functional additives with specific properties desired by the end user may be introduced at this point. As a non-limiting example, if the end user wants a negative ion emission effect, a substance can be added in order to produce the requested effect of making negative ions.

Techniques for forming the non-stick ceramic coating include painting, spinning, dipping and spraying. The most efficient technique is spray coating. The solution is then heated to 120° C.-300° C. for 10-30 minutes to remove water and organic solvent and to increase the density of the inorganic structure. The final coated product is then cooled to room temperature in air.

Figure 6A:
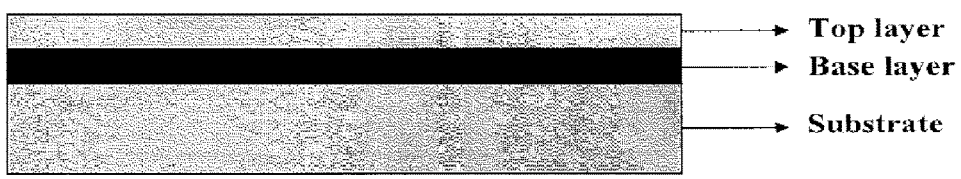
FIG. 6a is vertical section of a non-stick ceramic coating comprised of two layers in accordance with the present invention.
Figure 6B:
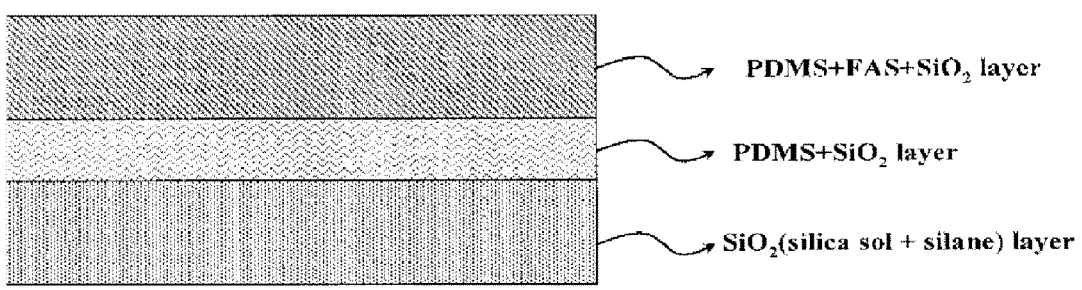
FIG. 6b is vertical section of the non-stick ceramic coating shown in FIG. 6a showing in more detail the composition and arrangement of the two layers in accordance with the present invention.

In preferred embodiments, a two layer coating procedure is carried out in order to obtain non-stick coating which has sufficient mechanical strength. FIG. 6a shows the structure of these two layers, identified as a top layer and a base layer directly contacting the substrate. As shown in FIG. 6b, the base layer is composed principally of a hybrid network or matrix of silica and organoalkoxysilane. As previously described, some of the silane in the base layer is substituted by an polysiloxane. As the polysiloxane has a lower specific gravity than the matrix solution, the polysiloxane will rise to the top of the base layer and float at the top so that the base layer will comprise a lower portion consisting of $SiO_2$ (silica sol and silane) and a distinct upper portion consisting of polysiloxane and $SiO_2$ (silica sol and silane) at the top of the base layer. Some amount of organoalkoxysilane in the base layer can be substituted to increase the adhesion power with substrate, for example, epoxysilane can be substituted to increase the adhesiveness to an aluminum substrate, in which case the epoxysilane will be present in the lower portion of the base layer. The lower portion of the base layer contains silica sol and organoalkoxysilane, in order to make a good adhesion with the substrate, whereas the upper portion of the base layer contains polysiloxane, in order to make a contribution to the non-stick function of the structure. The base layer can be colored as previously described.

The top layer is a transparent film which comprises non-stick materials and provides a very hard surface as well. The polysiloxane makes bonds with the main matrix via two Si—O-M bonds, and can increase the flexibility of the ceramic matrix. FAS can make three Si—O-M bondes to the main matrix, making the structure of the top layer harder than the base layer. The pigments present in the base layer tend to have a large particle size. Accordingly, keeping the top layer transparent enables the top layer to have much better mechanical properties than the colored base layer. This top layer is characterized by excellent non-stick performance and mechanical properties, and overcomes the disadvantages of prior art non-stick coatings.

The top layer is coated on the base layer in the wet state, just after coating the base layer onto the substrate. This enables some of the solutions of the top layer to diffuse and/or saturate into the upper portion of the solutions constituting the base layer and enhances the upper portion (polysiloxane+ $SiO_2$) of the base layer. This diffusion and/or saturation increase the durability of the structure's non-stick properties.

Figure 7A:
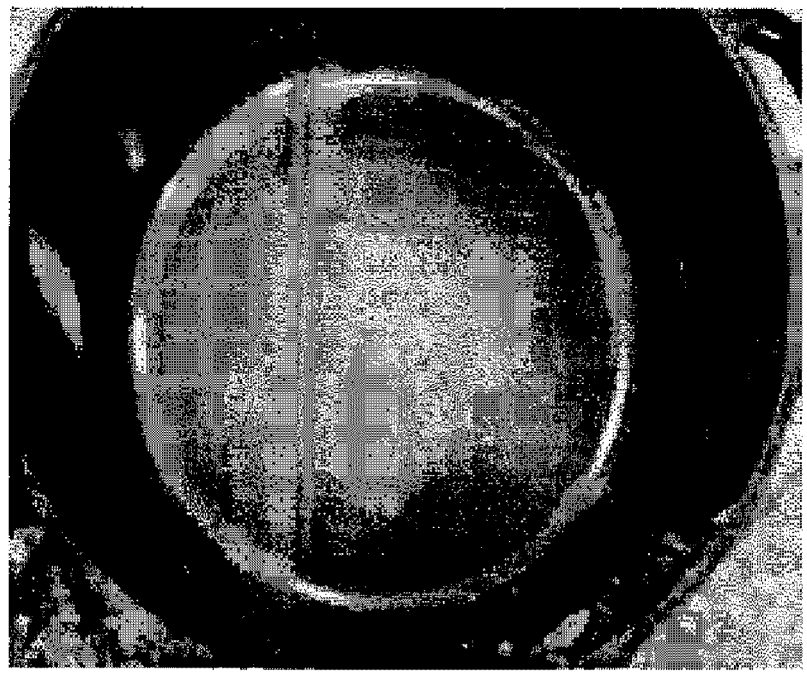
FIG. 7a is a picture of the test result of the mechanical property regarding abrasion resistance of the novel two layer non-stick ceramic coating of the invention.
Figure 7B:
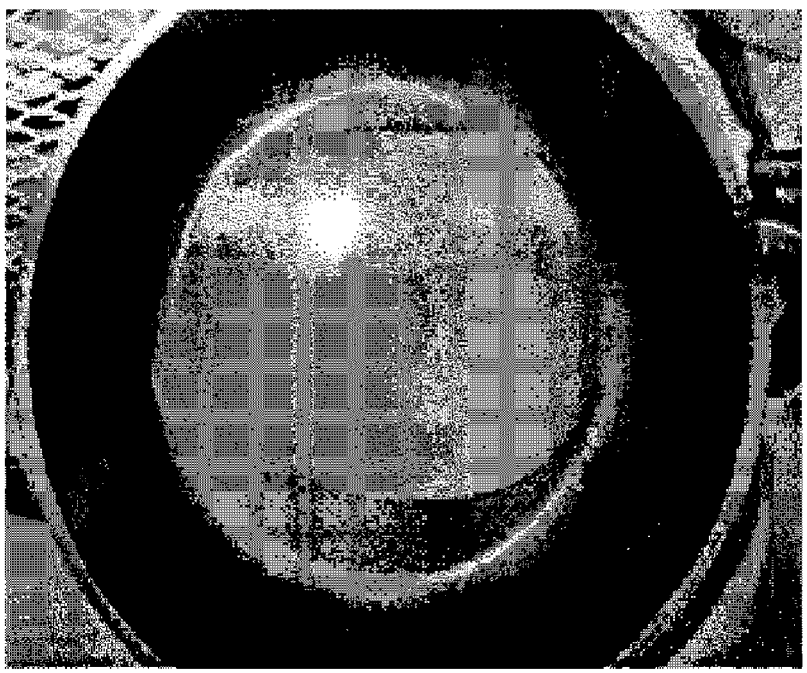
FIG. 7b is a picture of the test result of the mechanical property regarding scratch resistance of two layer non-stick ceramic coating of the invention.

FIGS. 7a and b show pictorially the abrasion and scratch test results, respectively. FIG. 7a is shows the result of a NORD test for abrasion with pancake. FIG. 7b shows the result of a MTP test for scratch resistance. While PTFE coatings known in the prior art have surfaces of only 3H-4H pencil hardness, the ceramic non-stick coating of the present invention has a surface of more than 9H pencil hardness.

I claim:

1. A non-stick coating composition comprising:

a colored base layer for bonding to a substrate, said base layer comprising:

70 to 85% by weight a first matrix comprising a condensation product of a silica sol and an alkoxysilane mixture, said alkoxysilane mixture comprising:

80-95% by weight of at least one organoalkoxysilane of chemical formula $R_xSi(OR')_{4-x}$, where R represents an organic substituent, R' represents an alkyl group, and $0 \leq x < 4$, and, 5-20% by weight of polysiloxane; and, 15-30% by weight of a colorant;

said base layer comprising a lower portion composed principally of (a) the condensation product of said silica sol and said organoalkoxysilane and (b) said colorant, and a distinct upper portion composed principally of (a) the condensation product of said silica sol and said polysiloxane and (b) said colorant; and, a top layer superimposed upon, and bonded to, said base layer, said top layer comprising a composed of a second matrix comprising a condensation product of a silica sol and an alkoxysilane mixture, said alkoxysilane mixture comprising 80-95% by weight of organoalkoxysilane of chemical formula $R_xSi(OR')_{4-x}$, where R represents an organic substituent R' represents an alkyl group, and $0 \leq x < 4$, 5-20% by weight of a polysiloxane, and about 0.3 to about 12% by weight of a fluoroalkylalkoxysilane.

2. The non-stick coating composition according to claim 1, wherein said at least one organoalkoxysilane is selected from the group consisting of (a) organoalkoxysilanes wherein x=0 and each R' is selected independently from the group consisting of methyl and ethyl; (b) organoalkoxysilanes wherein x=1, R is selected from the group consisting of straight-chain or branched $C_1$-$C_8$ alkyl groups and aromatic groups, and each R' is selected independently from the group consisting of methyl and ethyl; (c) organoalkoxysilanes wherein x=2, each R is selected independently from the group consisting of straight-chain or branched $C_1$-$C_8$ alkyl groups and aromatic groups, and each R' is selected independently from the group consisting of methyl and ethyl; (d) organoalkoxysilanes wherein x=3, each R is selected independently from the group consisting of straight-chain or branched $C_1$-$C_8$ alkyl groups and aromatic groups, and each R' is selected independently from the group consisting of methyl and ethyl; (e) organoalkoxysilanes wherein R is a substituent selected from the group consisting of $(R_AR_B)N(CH_2)_n$, $(R_AR_B)NNH(CH_2)_n$, $(R_AR_B)N(CH_2)_n[N(H)(CH_2)_m]_y$—, and $(R_AR_B)N(CH_2)_n[N(H)(CH_2)_m]_yCH_2$—, wherein $R_A$ and $R_B$ are independently selected from H, $C_1$-$C_8$ straight-chain, branched chain, and cyclic alkyl groups, or such that $(R_AR_BN)$ together describe a pyrrolidinyl, piperidinyl, or morpholino ring, $n \leq 3$, $m \leq 3$, and $y \leq 3$, and each R' is selected independently from the group consisting of straight-chain or branched $C_1$-$C_8$ alkyl groups and aromatic groups; (f) organoalkoxysilanes wherein R is a vinyl group, and each R' is selected independently from the group consisting of straight-chain or branched $C_1$-$C_8$ alkyl groups and aromatic groups; (g) organoalkoxysilanes wherein R is a 3-glycidoxypropyl group and R' is selected independently from the group consisting of straight-chain or branched $C_1$-$C_8$ alkyl groups and aromatic groups; (h) organoalkoxysilanes wherein R is a 3-methacryloxypropyl group and each R' is selected independently from the group consisting of straight-chain or branched $C_1$-$C_8$ alkyl groups and aromatic groups; (i) organoalkoxysilanes wherein R is an alkyl group in which at least one H atom is substituted with a halogen atom and each R' is selected independently from the group consisting of straight-chain or branched $C_1$-$C_8$ alkyl groups and aromatic groups; (j) organoalkoxysilanes wherein R is an —SH terminated alkyl group, and each R' is selected independently from the group consisting of straight-chain or branched $C_1$-$C_8$ alkyl groups and aromatic groups; and (k) any combination of the above.

3. The non-stick coating composition according to claim 1, wherein said organoalkoxysilane is methyltrimethoxysilane.

4. The non-stick coating composition according to claim 1, wherein said polysiloxane is OH-terminated polydimethylsiloxane.

5. The non-stick coating composition according to claim 4, wherein the OH-terminated polydimethylsiloxane has a molecular weight of between 400 and 6000.

6. The non-stick coating composition according to claim 1, wherein said polysiloxane is selected from the group consisting of polysiloxanes and polysiloxane copolymers of the general formula $QO—[SiR_AR_BO]_n—SiR_AR_BOQ$, wherein Q is selected from the group consisting of H and organic substituents, and wherein $R_A$ and $R_B$ are independently selected from H, straight-chain and branched-chain alkyl groups, aromatic groups, $RNHR'NH_2$, $C_3H_5O(C_2H_4)_m(CH_3C_2H_3O)_nH$, $C_3H_5O(C_2H_4)_m(CH_3C_2H_3O)_nR$, $(CH_2)_3OCH_2C_2H_3O$, and $(CH_2)_nCF_3$.

7. The non-stick coating composition according to claim 1, wherein said fluoroalkylalkoxysilane is present from about 0.3 to about 2% by weight.

8. The non-stick coating composition according to claim 1, wherein at least one matrix selected from the group consisting of said first matrix and said second matrix comprises a condensation product of a mixture comprising from about 30% to about 70% by weight said silica sol and about 2% to about 40% by weight $R_xSi(OR')_{4-x}$.

9. The non-stick coating composition according to claim 1, wherein at least one matrix selected from the group consisting of said first matrix and said second matrix additionally comprises a condensation catalyst in an amount of not more than 2% by weight.

10. The non-stick coating composition according to claim 1, wherein at least one matrix selected from the group consisting of said first matrix and said second matrix comprises about 10% to about 40% by weight.

* * * * *